8159X
P. Horney,
Washing Machine,
Patented Apr. 21, 1834.
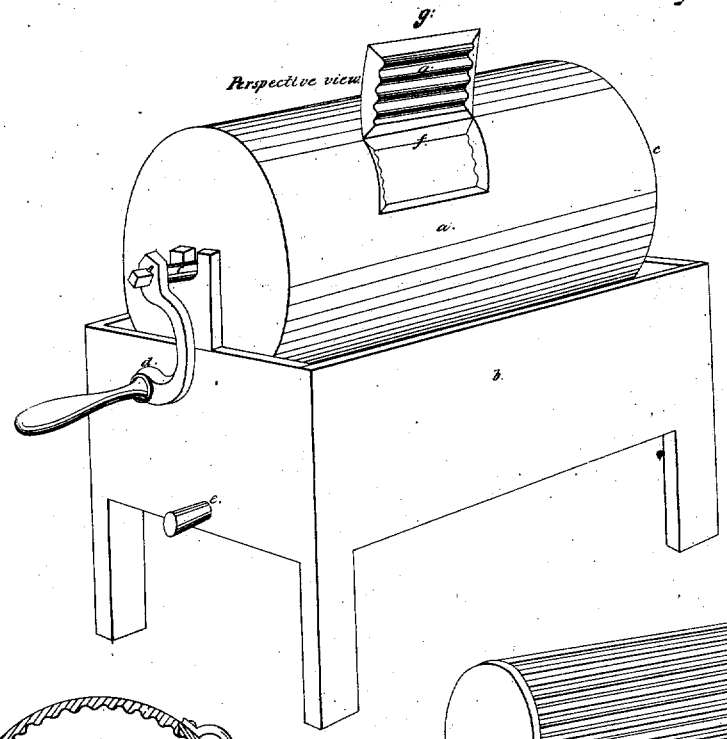
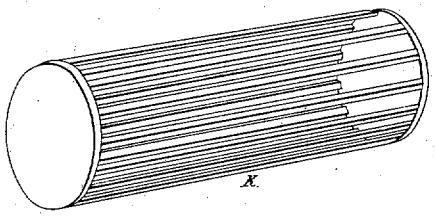
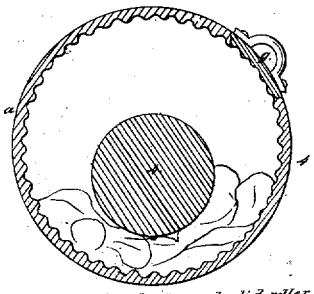
Section of the cylinder and solid roller.
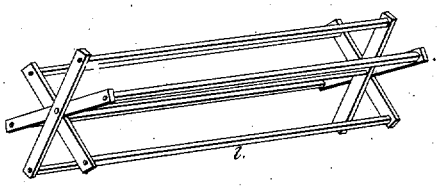
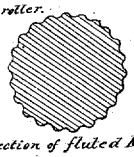
Section of fluted Roller.
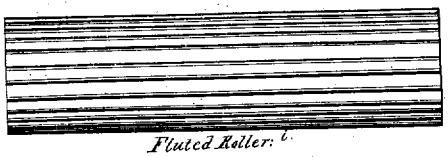
Fluted Roller. l.
N. PETERS, PHOTO-LITHOGRAPHER, WASHINGTON, D. C.

April 21. 1834. 427.

Philip Horney, Randolph County State of North Carolina

Letters Patent.

The schedule referred to in these Letters Patent and making part of the same containing a description in the words of the said Philip Horney himself of his improvement in the revolving Washing Machine Be it known that I Philip Horney in the County of Randolph & State of North Carolina, have made an improvement in the revolving washing machine for cleansing clothes which is described as follows, A cylinder or barrel is constructed like the common revolving washer turning on gudgeons on a frame of the ordinary form with a trough beneath it to catch the water emtied from the cylinder - on one of the gudgeons is a crank by which the cylinder is turned, A hole with a plug to fit it is made in the bottom of the trough to let off the dirty water, In one side of the cylinder is made a square or oblong opening to admit the clothes and water, The sides of this opening are made of a dove-tailed form into which is slid a cover or door with dovetailed edges & middle to fit the opening exactly and tightly so as to prevent the escape of steam and water, - The inside of the cylinder is fluted or grooved lengthwise in paral-lel grooves & within it is put a solid roller smooth or fluted or it may be a wallower or reel for rubbing & pressing the clothes. — The wallower or reel is made by fastening parallel slats on the circumference of round heads at the distance of two or three inches apart. —

The clothes with the soap & hot water are put into the cylin-der. the door made fast & the cylinder turned, which agitates the clothes about in the cylinder & drives the roller or wallower over & against them till they are completely cleansed by the continued rubbing & friction created by the revolving of the cylinder and movements of the roller or wallower within it
When the clothes are sufficiently washed the lid or door is drawn out, the cylinder turned partly round till the water is emptied into the trough below it, the clothes remaining in the cylinder fresh water is then poured into the cylinder & it is again turned till the clothes are rinsed, or they may be taken out and rinsed in a common tub, The subscriber wishes it to be understood, that he makes no claim to the cylinder frame and trough as these have long been known & used & are common property, — But what he does claim & which he desires to secure by Letters Patent is the mode of grooving or fluting the cylinder on the inside & making use of a revolving roller, wollower or reel within it to rub & press the clothes as before described Witnesses
B. Elliott
J. H. Brown Philip Horney 528 wds Drawing